Figure 1:
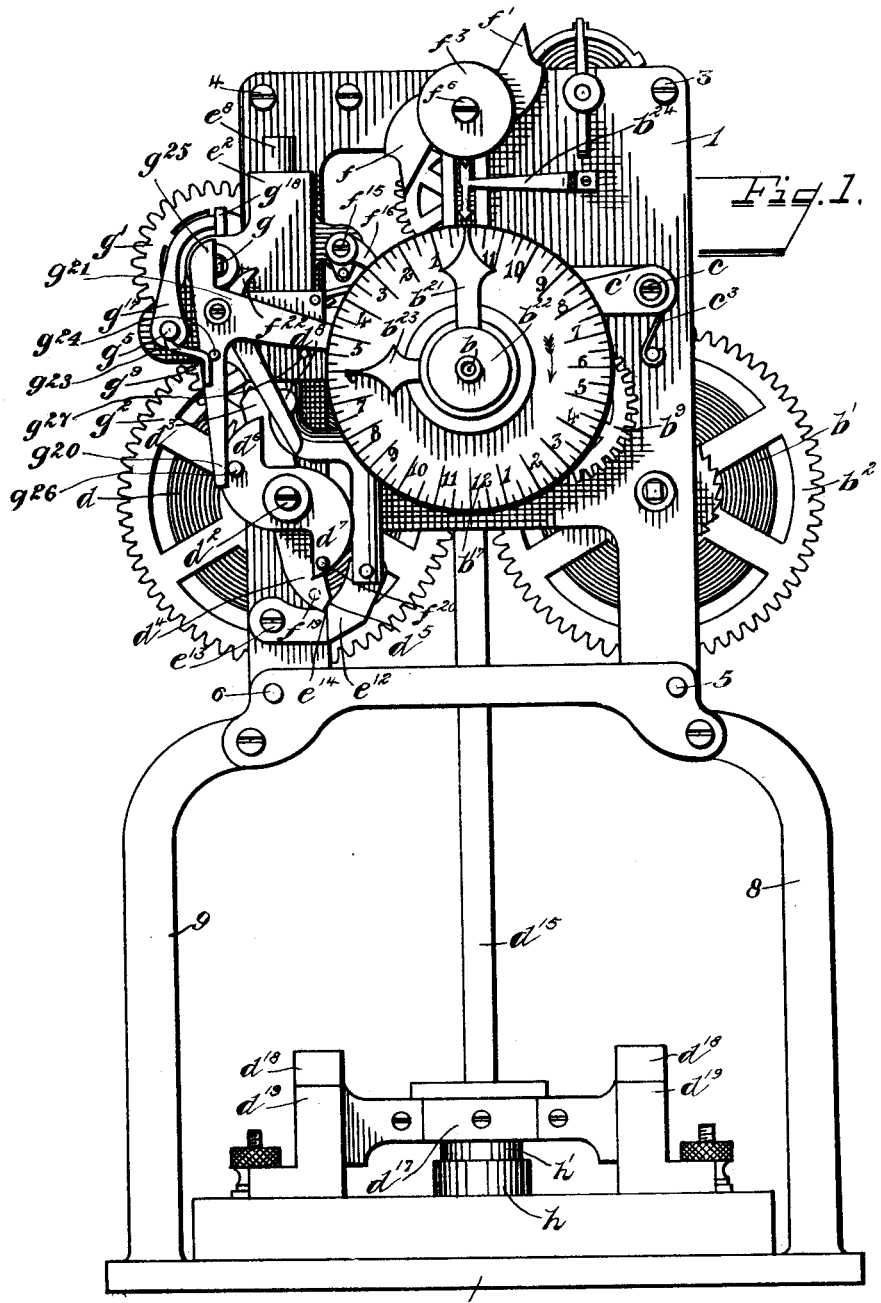

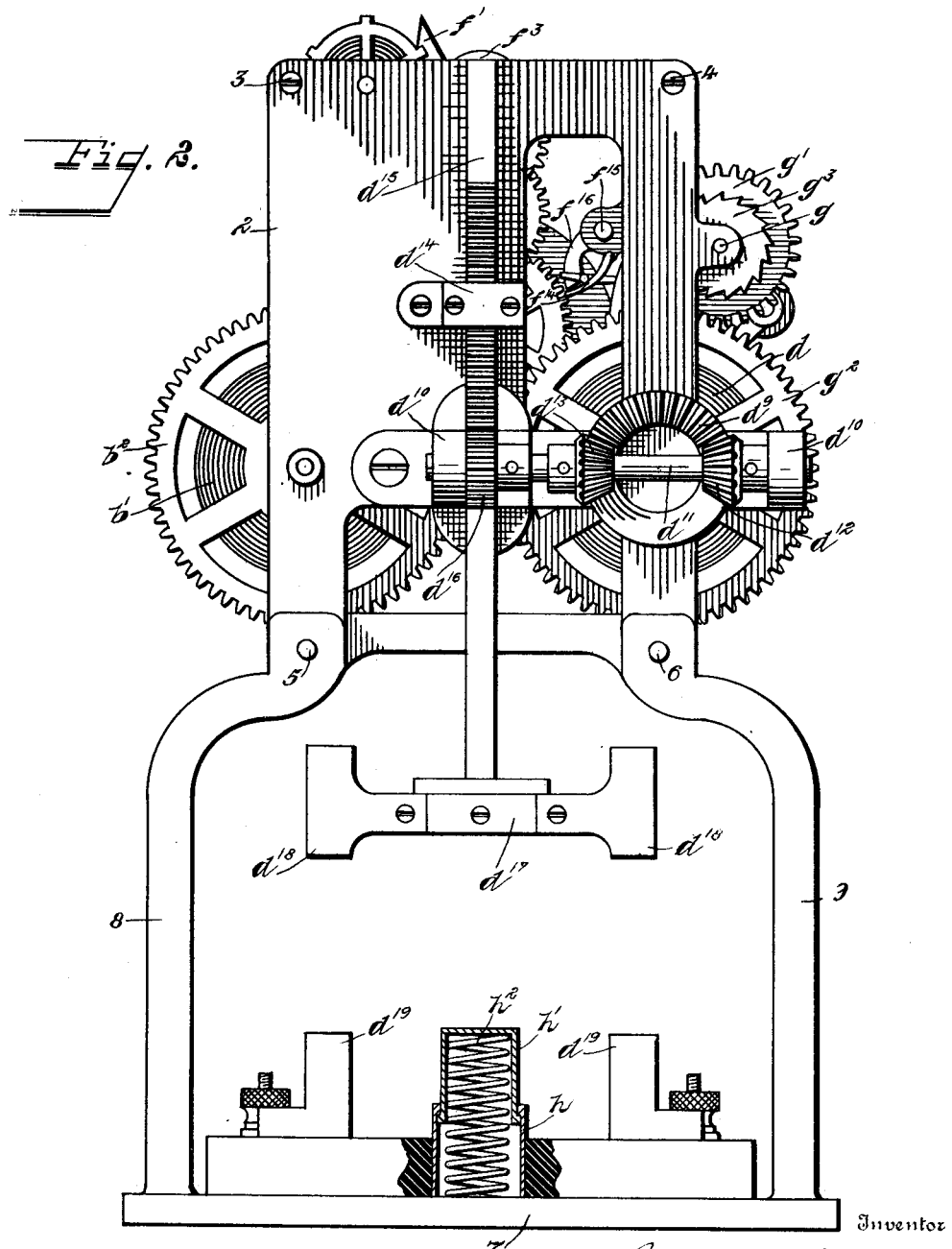

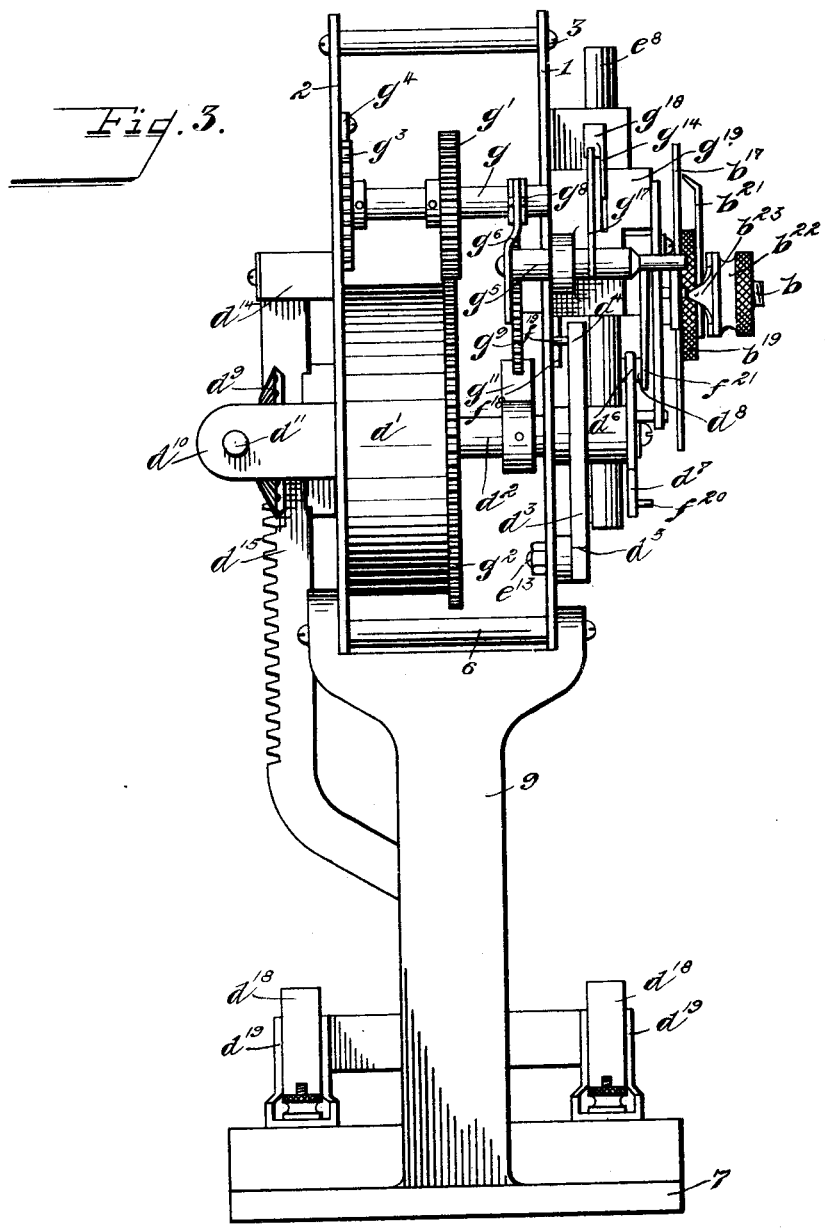

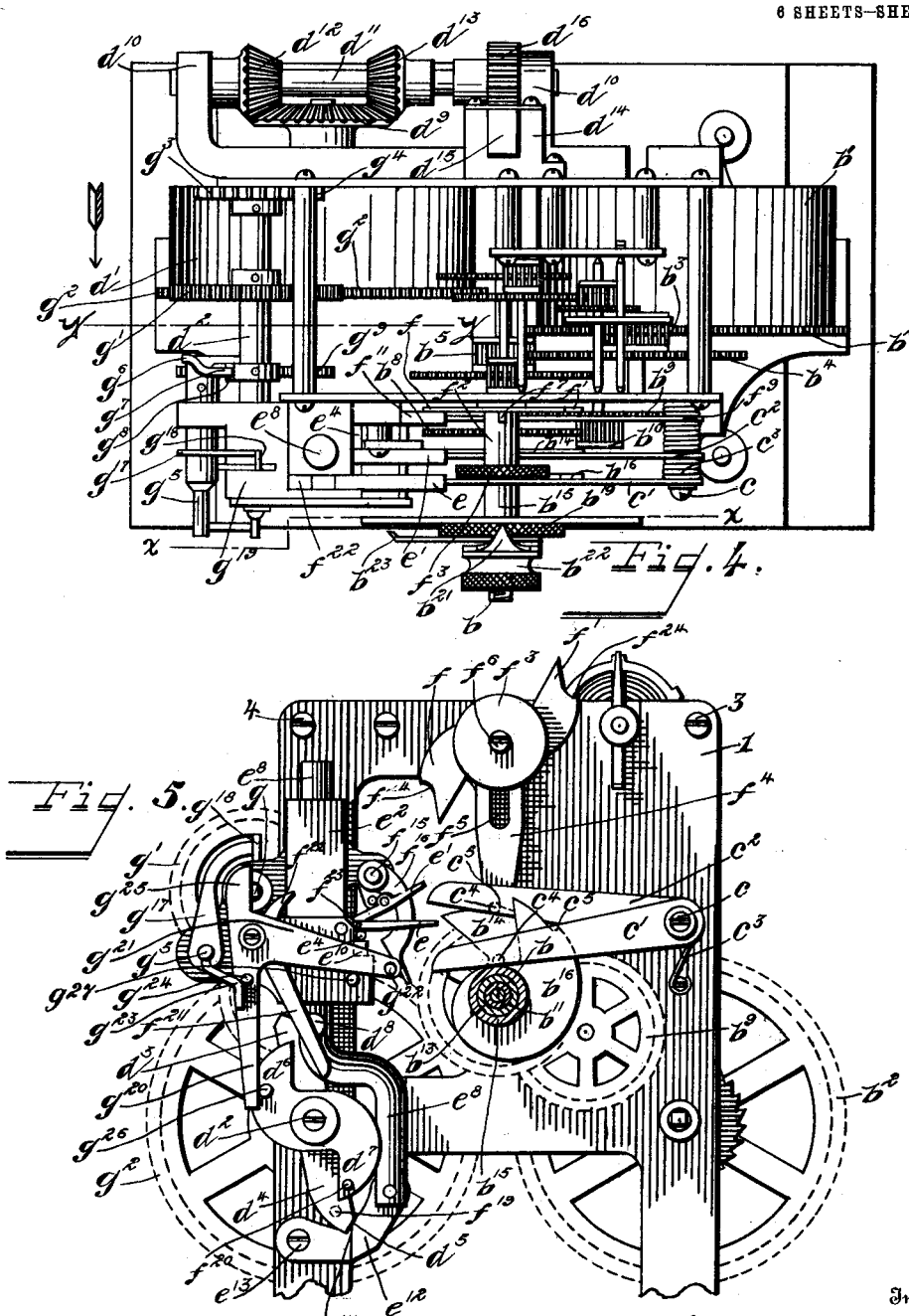

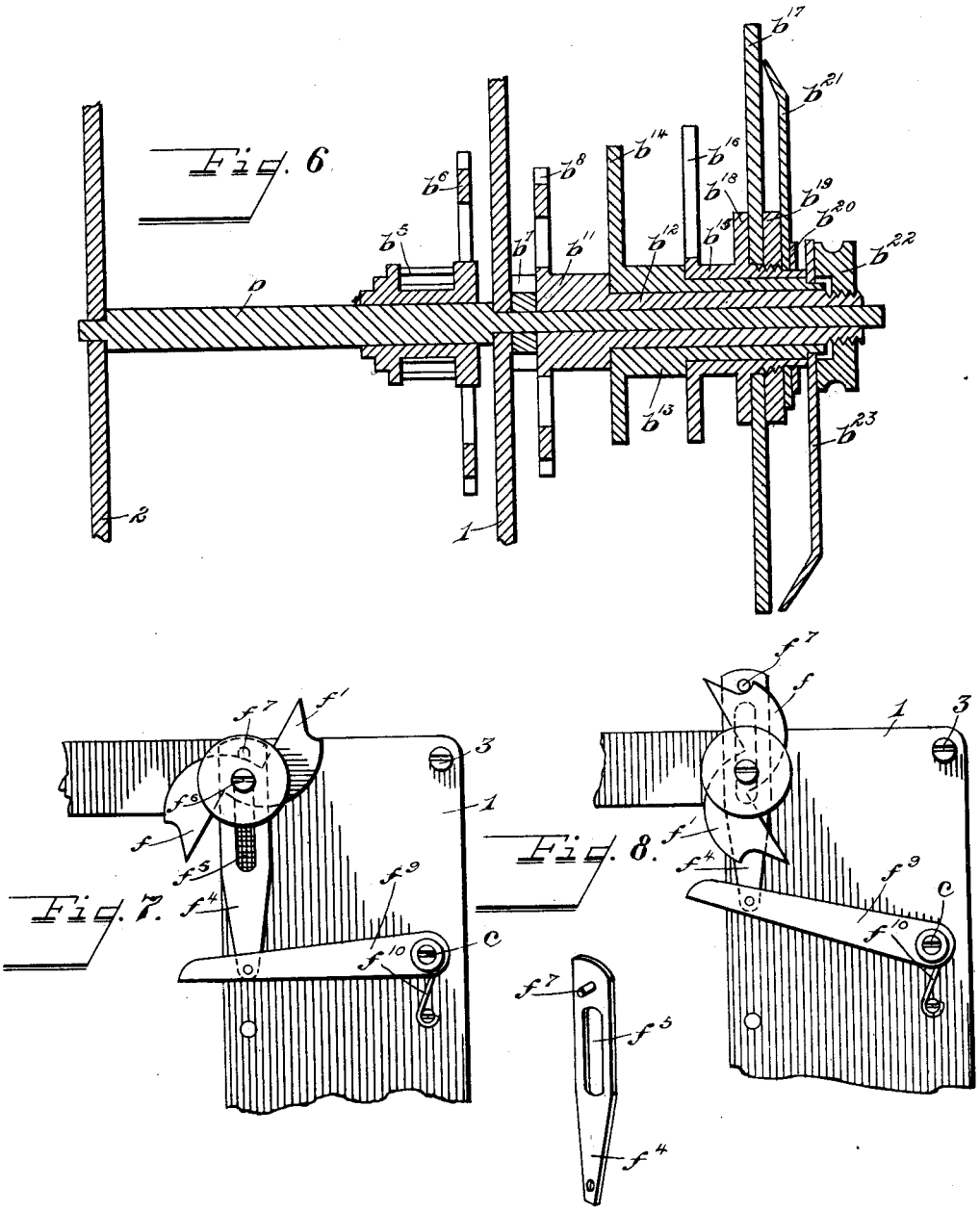

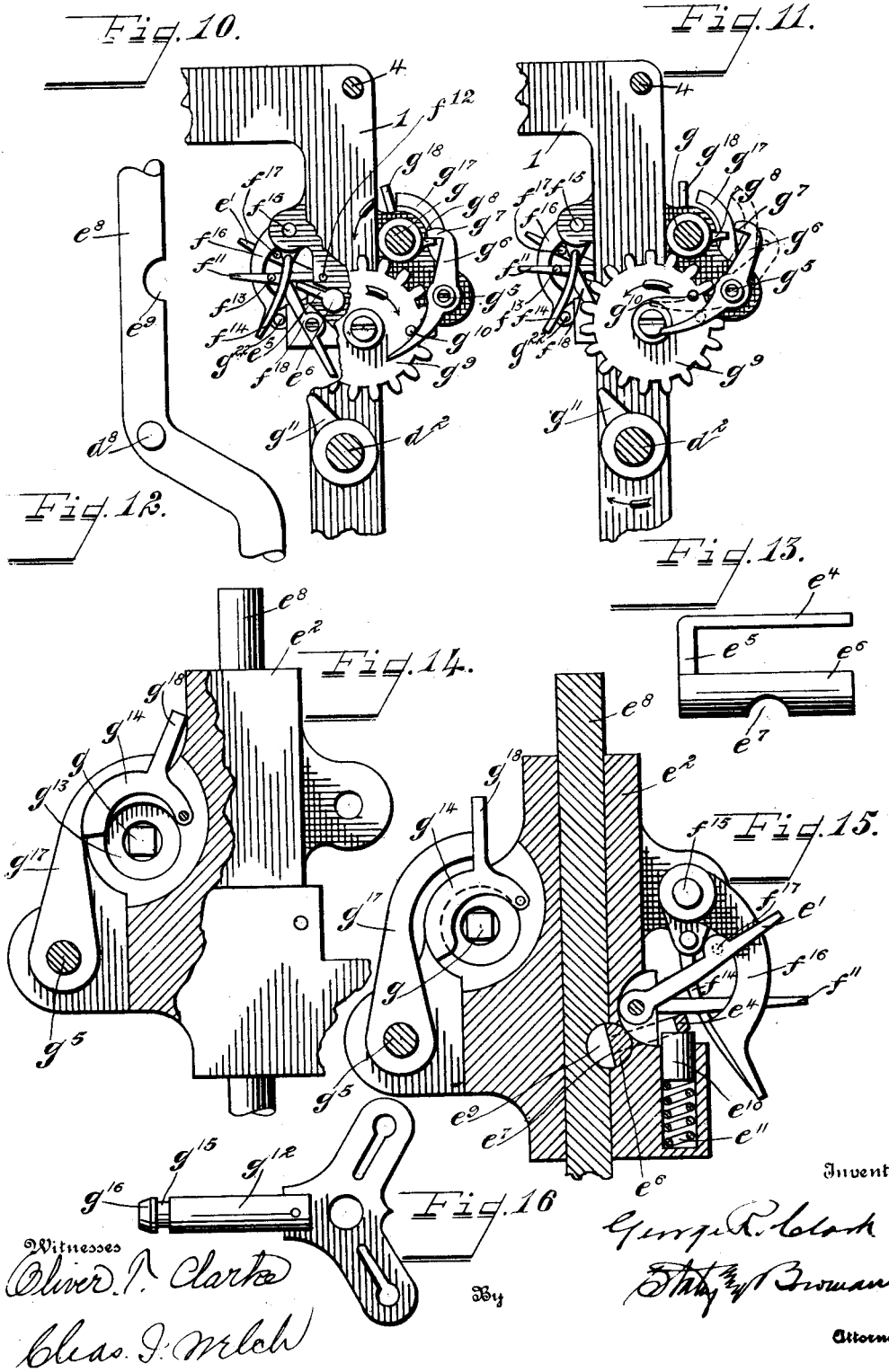

UNITED STATES PATENT OFFICE.

GEORGE R. CLARK, OF DAYTON, OHIO, ASSIGNOR TO CLARK & HARVEY, OF DAYTON, OHIO, A PARTNERSHIP COMPOSED OF GEORGE R. CLARK AND THOMAS J. HARVEY.

TIME-CONTROLLED OPERATING MECHANISM.

1,109,280.     Specification of Letters Patent.     Patented Sept. 1, 1914.

Application filed November 10, 1909. Serial No. 527,209.

*To all whom it may concern:*

Be it known that I, GEORGE R. CLARK, a citizen of the United States, residing at Dayton, in the county of Montgomery and State of Ohio, have invented certain new and useful Improvements in Time-Controlled Operating Mechanism, of which the following is a specification.

My invention relates to improvements in automatically time-controlled operating devices, the especial object being to provide devices for operating electric switches, although the mechanism may be adapted for use for the operation of other devices.

An object of the invention is to provide a device of the character referred to which is capable of operating electric switches of large capacity.

A further object of my improvements is to provide means for preventing the running down of the motor mechanism when the lights are on, means being employed for automatically throwing out of operation the operating devices at the end of a certain definite period and for maintaining said devices out of operative position until the mechanism has been fully re-wound.

A further object of my invention is to provide means for turning the lights on or off at any time by hand and at the same time for automatically throwing out of commission the tripping device which, in the usual course of events, would next cause the operation of the motor mechanism; and also to provide means whereupon, at the next operation of the machine, this tripping device will be restored to normal operative position.

A further object of the invention is to provide for the setting of the tripping devices to cause them to operate at certain predetermined times without mental calculation upon the part of the operator.

A further object is to simplify, cheapen the construction and make more effective the operation of devices of this character.

The invention consists in the construction and combination of parts hereinafter described and set forth in the claims:

In the accompanying drawings: Figure 1 is a front elevation of a machine embodying my improvements. Fig. 2 is a rear elevation of the same. Fig. 3 is an end elevation of the same. Fig. 4 is a top plan view of the same. Fig. 5 is a vertical section of the upper portion of the machine on the line $x$—$x$ of Fig. 4. Fig. 6 is a sectional view of the clock arbor, dial and some of the tripping devices mounted thereon. Fig. 7 is a detail of the hand-operated device for tripping the mechanism to throw the lights on or off. Fig. 8 is a detail of the same, showing the parts in different position. Fig. 9 is a detail of a part of the hand-operated devices. Fig. 10 is a detail view showing the locks, for the winding mechanism and the winding key, together with the device for operating said locks; also the tripping pawls for the motor mechanism and some other devices for throwing one of said pawls out of commission when the hand-operated devices are operated. Fig. 11 is a view of the same parts showing them in different position of operation. Fig. 12 is a detail of a part of the tripping devices for the motor mechanism. Fig. 13 is a detail of the lock for the motor mechanism. Fig. 14 is a detail of the winding key-lock. Fig. 15 is also a detail view in section showing the winding key-lock and some of the tripping devices for the motor mechanism. Fig. 16 is a detail of a winding key of special construction.

Like parts are represented by similar characters of reference in the several views.

*Frame.*—In the said drawings, 1 represents a front vertically disposed supporting frame or plate, and 2 a similarly arranged rear plate, connected together at the top by transverse rods 3 and 4 and being secured at the bottom to a lower supporting frame by rods 5 and 6; this lower frame-work being made up of a base, 7, and upright standards 8 and 9.

*Tripping devices.*—Loosely mounted in the frame parts 1 and 2 is a shaft or arbor $b$ (see Fig. 6 for detail), which arbor is driven from the clock motor spring $b'$ through the medium of the gear, $b^2$, pinion $b^3$, gear $b^4$ and pinion $b^5$, which pinion $b^5$ is fast to the said arbor $b$; a gear $b^6$ secured to said pinion being connected with any suitable and well-known clock mechanism for controlling the movement of the clock motor so as to cause said arbor to revolve once every 12 hours. A pinion $b^7$, fast to the arbor, drives the gear $b^8$, loose on said arbor, through the medium of the gear $b^9$ and pinion $b^{10}$, the proportion of the gearing being such that the gear $b^8$ will be caused to revolve once every 24 hours. This gear $b^8$ has an enlarged hub $b^{11}$ and an extended sleeve $b^{12}$ fitted loosely about the arbor. Loosely mounted on the sleeve $b^{12}$ and abutting against the enlarged hub $b^{11}$ is a second sleeve $b^{13}$, carrying at its inner end a cam, $b^{14}$. Loosely mounted on the sleeve $b^{13}$ and abutting against a shoulder formed thereon is a third sleeve $b^{15}$, which also carries at its inner end a cam, $b^{16}$. Loosely mounted upon the sleeve $b^{15}$, is a dial $b^{17}$, graduated in two sections from 1 to 12, which graduations read from right to left, as shown in Fig. 1. This dial, while loose on said sleeve, is adapted to be clamped thereto through the medium of the collar, $b^{18}$, secured to the sleeve, and nut $b^{19}$ screwthreaded on the sleeve. Connected to the end of said sleeve $b^{15}$, which is squared, by a lock washer $b^{20}$ is an indicating hand $b^{21}$. Secured to the squared end of the sleeve $b^{13}$ by the nut $b^{22}$, is a second indicating hand $b^{23}$, said nut being screwed onto the end of the arbor. By the construction described the indicating hands, and hence the cams $b^{14}$ and $b^{16}$, may be set to the proper position with respect to the dial, and the hands, dial sleeve and gear $b^8$ all clamped together so as to revolve once every 24 hours. The particular feature of novelty in this construction is the manner of setting the hands without the aid of mental calculation.

By referring to Fig. 1 it will be observed that the dial is divided into two series of indications from 1 to 12 inclusive, these indications being arranged reversely to the direction of rotation of the dial indicated by the arrow. If the operator wishes to set the mechanism so that the lights will be turned on at 5 o'clock p. m. and be turned off at 10 o'clock p. m. he first moves the dial so that one of the indications thereon representing the exact hour of the day will come opposite the stationary pointer $b^{24}$, (Fig. 1). For instance, if the time at which he sets the mechanism is 10 o'clock a. m., he turns the dial until one of the indications "10" thereon registers with the stationary pointer $b^{24}$. Then, by causing the turn-on pointer to register with the first indication 5 and the turn-off pointer to register with the first indication to the left of pointer 10, and then securely fastening the parts together in the manner before described the mechanism will be properly set to turn on and off the lights at the proper time desired.

Pivotally mounted upon a stud, $c$, projecting forwardly from the frame part 1, are two trip-arms $c'$ and $c^2$, which arms extend alongside the respective cams $b^{14}$ and $b^{16}$ and are normally spring-pressed downwardly by the coil springs $c^3$ arranged about the stud $c$ and exerting their influence on said arms. Each of the arms has a laterally projecting pin $c^4$, shown in dotted lines in Fig. 5, which project over the respective cams so that as said cams revolve the arms will be raised and, at the proper time determined by the position to which the cams have been set, the pins will ride off of the high points of the cams and permit the arms to drop by the tension of their springs.

Located in the path of movement of each of the trip-arms is a pivoted pawl $e$ and $e'$, these pawls being each pivoted at one end to a support $e^2$ secured to the frame part 1. Extending transversely beneath these pivoted pawls is a small cross-bar $e^4$ (see Figs. 4, 5, 13 and 15) which cross-bar is connected to a crank $e^5$ (Fig. 10) secured to a rotatable lock $e^6$ located in said frame part $e^2$. This rotatable lock $e^6$ is cylindrical in form and one part thereof is flattened as indicated at $e^7$ in Figs. 13 and 15. Extending vertically through a channel in this support $e^2$ is a rod, $e^8$, and formed in this rod at a point normally coincident with the flattened portion of the lock $e^6$ is a rounded recess $e^9$ of a size equal to that of the diameter of the cylindrical lock. Located in the support $e^2$ beneath the cross-bar $e^4$ is a plunger $e^{10}$ (Fig. 15) normally spring-pressed by a spring $e^{11}$ up against the cross-bar so as to normally rock the cylindrical lock to the position shown at Fig. 15, in which position the rod $e^8$ is locked against movement. The lower end of this rod is offset and is pivotally connected to the end of an arm $e^{12}$, the opposite end of said arm being pivoted at $e^{13}$ to the frame part 1. This arm $e^{12}$ has formed thereon a rounded or beveled shoulder $e^{14}$ and this shoulder normally forms, when the rod $e^8$ is locked, a bar to the motor mechanism hereinafter described, but whenever one of the trip-arms $c$ or $c'$ is released by its cam this pivoted arm $e^{12}$ will yield to release the motor mechanism by reason of the fact that the trip-arm operating upon one of the pawls $e$ or $e'$ will rock the cylindrical lock $e^6$ through the medium of the cross-bar and crank and thus unlock or release the rod $e^8$.

*Motor mechanism.*—$d$ is the main-spring of the motor mechanism, one end of said spring being connected to the inclosing barrel $d'$ and the other to a shaft $d^2$ to cause said shaft, when released, to rotate. Connected to the outer end of said shaft are two projecting arms $d^3$ and $d^4$ (Fig. 5) and the said shoulder $e^{14}$ on the arm $e^{12}$ normally stands in the path of movement of the ends of said arms so as to form a bar therefor, and hold the shaft at rest. The end of each of these arms is formed with an inclined surface $d^5$ which rests against the beveled or inclined part of the said shoulder so that when the said rod $e^8$ is unlocked in the manner before described the tension of the motor spring, $d$, will cause the arm $d^4$ or $d^5$ which is in contact with said beveled shoulder to force said pivoted arm $e^{12}$ downwardly and thus release the motor mechanism, permitting the shaft $d^2$ to revolve for a period of one-half revolution. Before the shaft has completed this one-half revolution, however, the shoulder $e^{14}$ will again be brought into the path of movement of the other arm so as to again form a bar to the motor mechanism and arrest the same. This is accomplished by providing two cam-shaped projections $d^6$ and $d^7$ connected to the outer end of said shaft so as to revolve therewith, either one of which cam-shaped projections, when the shaft is revolved, being adapted to contact a pin $d^8$ extending laterally from the rod $e^8$ and thus force said rod upwardly until it is again engaged by the rotatable lock $e^6$ before described. Connected to the rear end of the said shaft $d^2$ is a mutilated bevel gear $d^9$, one-half of this gear being devoid of teeth. Located in suitable bearings $d^{10}$ secured to the rear frame portion 2 is a longitudinal shaft $d^{11}$ which has secured thereto two beveled pinions $d^{12}$ and $d^{13}$ located on either side of the mutilated gear $d^9$ and adapted to be alternately engaged with the teeth thereof so as to first give said shaft $d^{11}$ a movement in one direction by a one-half revolution of said motor shaft $d^2$ and then a movement in the opposite direction upon the next succeeding of one-half revolution of said shaft $d^2$. Located in suitable guides $d^{14}$ on said frame part 2 is a vertical rack $d^{15}$, the teeth of which are in mesh with the pinion $d^{16}$ secured to said shaft $d^{11}$. The lower end of this rack carries one member $d^{17}$ of the switch which member carries preferably four contacts $d^{18}$. The other contacting members $d^{19}$ of said switch are located on the base 7 of the machine, four being provided, one for each contact $d^{18}$. Each of the cams $b^{14}$ and $b^{16}$ near the high part thereof is provided with a shoulder $c^5$, which shoulders coöperate with the pins of the respective trip-arms to prevent any backward movement of the cams after the pins have dropped over said shoulders. The shoulders are so located that the pins will drop over them just about the time that the outer ends of the trip-arms pass the respective pawls, $e$ and $e'$, on the upward movement of the trip arms; it being understood that these pawls swing freely upward to permit the passage of said arms on their upward movement. The pins having dropped over the shoulders, will form a bar against any backward movement of the cams such as might be caused when the operator is setting the indicating hands and accidentally permits the devices to move backwardly; it being understood that as the hands are set and the cams turned, the raising of the arms $c$ and $c^1$ puts their springs under tension and causes the pins $c^4$ to exert a pressure against the cams, this having a tendency to turn them backward. It will be understood that if one of the cams is permitted to move back after its trip-arm had passed the pawl on the upward movement, this would cause the trip-arm to drop back again and trip the pawl and release the motor mechanism and would probably hold the pawl down so that the mechanism, and hence the switch, would operate continuously. The result of this construction is that each time the motor mechanism is released by the devices described the rack $d^{15}$ will be operated rapidly up or down to open or close the switch.

*Hand-operated trip.*—It is sometimes desirable to turn the lights on or off before the regular time or the time at which the mechanism is set. In order to accomplish this, I have provided a hand-operated device so arranged that the operator can open or close the switch and at the same time throw out of commission the trip which would, in the ordinary course of events, next be operated; means being further provided, upon the next operation of the mechanism, to again restore this trip to normal operative position. This hand-operated device is best illustrated in Figs. 5, 7, 10, 11 and 15. Rotatably mounted upon a stud which projects forwardly from the frame part 1, are two oppositely arranged cams $f$ and $f'$, each of said cams being provided with a shoulder $f^{24}$ to prevent any backward movement of the cam for the same purpose as described in connection with the shoulders on the cams $c$ and $c'$. The sleeve $f^2$ to which these cams are connected has secured at its outer end a knurled finger-piece $f^3$. Located adjacent the cams is a vertically disposed link or rod $f^4$ provided with a slotted opening $f^5$ to permit said rod to straddle the stud $f^6$ upon which the cams are mounted. The upper end of this link is provided with a laterally projecting pin $f^7$ lying in the path of movement of the cams so that whenever the cams are turned by the operator this link or rod, $f^4$, will be raised. This link $f^4$ has its lower end pivoted to the outer end of a trip-arm $f^9$; the inner end of this arm being pivoted to the stud $c$. A spring $f^{10}$ coiled about the stud, $c$, and having one of its ends connected to the trip-arm $f^9$ and the other end to the frame part 1, normally exerts its influence to throw said trip-arm downwardly. The result of this construction is that each time the operator raises the trip-arm $f^9$ through the medium of the cam and link, so soon as the pin $f^7$ rides off the cam which has raised it, the trip arm $f^9$ will be projected quickly downwardly.

Located in the path of movement of the outer end of said trip-arm is a pivoted pawl, $f^{11}$, pivoted at $f^{12}$ preferably to the support $e^2$ previously referred to in line with the pawls $e$ and $e^1$ and above the cross-bar $e^4$ so that when the trip arm $f^9$ is operated in the manner described, the pawl $f^{11}$ will rock the cross-bar to release the motor mechanism in the manner described in connection with the pawls $e$ and $e^1$ and trip arms $c$ and $c^1$. Extending laterally from the side of this pawl $f^{11}$ is a pin, $f^{13}$, Figs. 10 and 11, and located in the path of movement of this pin $f^{13}$, is a curved arm, $f^{14}$, connected at its upper end to a rock-shaft $f^{15}$ located in said support. Connected to the opposite end of this rock-shaft $f^{15}$ is a curved or cam-shaped projection $f^{16}$. Projecting from the pawl $e'$, which it will be remembered is the pawl for closing the switch, is a laterally projecting pin $f^{17}$ Figs. 10, 11 and 15 extending into the path of movement of the curved or cam-shaped projection $f^{16}$. The result of this construction is that when the hand-operated trip-arm $f^9$ is operated the pin $f^{13}$ on the pawl, $f^{11}$, will strike the arm $f^{14}$, and rock the shaft $f^{15}$, swinging the cam-shaped projection $f^{16}$ inwardly and cause the pin $f^{17}$ to ride up the curved surface thereof and thus raise the pawl $e'$ to the position shown in Fig. 10, in which position it will be out of the path of movement of the trip-arm $c^2$ so that when said trip-arm is operated at the time set for turning on the lights the outer end thereof will miss the pawl $e'$ and thus leave the lights on. The rock-shaft $f^{15}$ is fitted snugly in the bearing so that when it is rocked, it will be held in this position by friction.

In order to restore the pawl $e'$ again to operative position upon the next operation of the machine, I have provided a pivoted lever $f^{18}$, the lower end of which is adapted to be struck by a pin $f^{19}$ (see Figs. 3 and 5) extending laterally from the inner side of the arm $d^4$. This will cause the upper end of the lever $f^{18}$ to strike the curved arm $f^{14}$, which is located in the path of movement of the upper end of said lever, and thus rock the shaft $f^{15}$ in the opposite direction and permit the pawl $e'$ to drop back to its operative position.

Means are further provided for throwing the pawl, $e$, out of commission every time the switch is opened and for permitting the same to drop back into operative position when the switch is closed; the pawl, $e$, being the one which is operated upon by the trip-arm $c'$ to open the switch and turn off the lights. Extending laterally from the outer end of the cam $d^7$, which, as before explained, is connected to and revolves with the motor shaft, is a pin $f^{20}$, adapted when the mechanism is operated to turn off the lights, to contact the lower end $f^{21}$ of a pivoted lever so as to cause the upper end $f^{22}$ of said lever to contact the rear end of the pawl $e$; which projects beyond the pivotal point of said pawl as shown in Fig. 4, and thus raise said pawl to bring its outer end out of the path of movement of the trip-arm $c'$. The said pin $f^{20}$ will hold the lever $f^{21}$ in this position until the next operation of the machine, whereupon the lever will be released and swing by gravity back to the position shown in Fig. 5 and thus permit the pawl $e$ to swing back to its operative position. A small pin $f^{23}$ on the pawl, $e$, serves to form a stop to limit its movement when swung out of operative position by the said lever.

*Winding mechanism and cut-out devices.*—I have provided means for preventing the motor spring, $d$, from running down to such an extent that it might fail to completely open the switch at the time set for this operation so as to prevent any danger of burning out the switch from arcing. I accomplish this by providing for automatically throwing out of operation certain of the tripping devices at the end of a certain pre-determined number of operations of the machine; as, for instance, at the end of the 20th operation. I also further provide so that these tripping devices are thrown out of operation upon a switch-opening movement of the mechanism so that there will be no possibility of the switch being left closed for a period longer than the time set. I accomplish this in the following manner: Journaled in a suitable bearing on the frame part 2 and also in a bearing formed on the support $e^2$ is a winding shaft, $g$, which has a gear or pinion $g'$ meshing with the large gear $g^2$ secured to the barrel $d'$, which surrounds the motor spring and to which one end of said spring is connected. A ratchet $g^3$ secured to the shaft and a pawl $g^4$ secured to the frame prevents backward rotation of said shaft. Journaled in a suitable bearing formed on the support $e^2$ is a rock shaft $g^5$ which carries at one end an operating lever, $g^6$ (see Figs. 10 and 11 for detail) which lever has at one end a lateral projection $g^7$ adapted, when the winding shaft has been wound a certain number of revolutions, to be thrown into the path of a tooth $g^8$ on said shaft and thus lock the shaft from further movement, as indicated in Fig. 10. The normal position of the rock shaft and lever $g^6$ is that shown in Fig. 11 and the parts will go to this position by gravity or otherwise when released by the operating devices presently to be described.

Pivoted to the forward part of the support $e^2$ is a lever $g^{20}$ (see Figs. 1 and 5) one arm $g^{21}$ of which carries a cross-bar $g^{22}$ which extends under the entire series of pawls, $e$, $e'$ and $f^{11}$. (See Figs. 5, 10, 11 and 15.)

Journaled to the frame part 1 beneath the shaft, $g$, is a star wheel $g^9$ carrying a laterally projecting pin $g^{10}$ and I have provided means for causing said star wheel to make one complete revolution during the period of twenty operations of the machine referred to. Secured to the motor shaft $d^2$ is a projecting tooth $g^{11}$ adapted, at each complete revolution of said shaft, or every second operation of the mechanism, to engage the star wheel and move it one-tenth of a revolution. This projection $g^{11}$ is positioned on the shaft $d^2$ so that it will engage and move the star wheel by that movement of the shaft $d^2$ which is caused by the tripping device which releases the motor to open the switch so that as before stated it will be by one of these switch-opening movements that the pin $g^{10}$ will be caused to engage the lower end or tail of the lever $g^6$, which lies in the path of movement of said pin. The star wheel will be revolved by the motor shaft in the direction of the arrow shown in Fig. 11 so that the pin $g^{10}$ will strike the convex side of the lower end of the lever $g^6$ and rock the shaft $g^5$ so as to cause the arm $g^{23}$ on the opposite end of said shaft to contact a pin, $g^{24}$ on the said lever $g^{20}$ and rock said lever so as to cause the cross-bar $g^{22}$ to lift all of the pawls, $e$, $e'$ and $f^{11}$, out of the path of movement of their respective trip-arms, $c$, $c'$ and $f^9$ and effectually prevent any operation of the mechanism until the motor spring has been rewound.

For the winding of the motor I have devised a key of special construction and have also provided means whereby, after the key has been inserted, it may not be withdrawn until the motor has been fully re-wound. In order to accomplish this I have provided for locking the motor shaft at a certain point. At each revolution of the winding shaft during the winding operation the tooth $g^8$ thereon will engage the star wheel and turn the same in the opposite direction from that in which it was turned by the motor shaft, or in the direction shown by the arrow in Fig. 10. If, therefore, the motor spring has become so fully run down that the pawls have been thrown out of commission in the manner described, it will be seen that the star wheel will start from the position shown in dotted lines in Fig. 11 and so soon as it has been turned sufficiently the pin $g^{10}$ will strike the opposite side of the tail of the lever $g^6$ as shown in Fig. 10 and throw the projection $g^7$ on said lever into the path of movement of the tooth $g^8$ and thus lock the winding shaft $g$, from further revolution.

In order to insure the complete winding of the motor I have provided means for locking the key to prevent its withdrawal until the complete winding of the motor has been accomplished. In Fig. 16 is shown the winding key $g^{12}$ which is one of special construction. As before stated, one end of the winding shaft is journaled in a bearing formed on the support $e^2$, this bearing being represented by $g^{13}$ in Figs. 14 and 15. The bearing $g^{13}$ is projected a short distance beyond the squared end of the winding shaft $g$ and has pivoted thereto a key-lock $g^{14}$ which when the key is inserted, falls down in the recess $g^{15}$ of said key and prevents its withdrawal; the end of the key being formed with a beveled end $g^{16}$ so that when the key is inserted the lock will be forced upwardly out of the way of the key but will fall back by gravity into the recess $g^{15}$. A small housing $g^{19}$ is formed on the support $e^2$ in line with the extended end $g^{13}$ of the bearing and forms in effect a continuation of the same with a slotted opening between them to receive the key-lock, as shown in Fig. 4. Secured to the end of the rock-shaft $g^5$ previously described is a projecting finger $g^{17}$ adapted, when said shaft is rocked by the pin $g^{10}$ to lock the winding shaft, to contact a projection $g^{18}$ on said key-lock and swing the same to the position shown in Figs. 10 and 14 and thus release the key. As this locking of the winding shaft does not take place until after a predetermined number of revolutions of said winding shaft, it will be seen that it will be impossible to withdraw the key until the complete number of desired revolutions of the winding shaft have been given. Further, it will be seen that the winding of the motor will be uniform, since the star-wheel must be turned backwardly by the winding shaft the same distance that it has been turned forwardly by the motor mechanism.

The motor shaft may be wound at any time except when the lights are on. I have devised means for preventing the winding of the motor while the lights are on by providing a door for the key-hole, adapted to be automatically locked when the switch is closed and to be automatically unlocked when the switch is open. This door $g^{25}$ is connected to the lever $g^{20}$ and is adapted to normally project over the key-hole as indicated in Fig. 5, but may be readily swung out of the way by the operator for the insertion of the key at all times except when the switch is closed. In order to prevent this door from being swung at such a time I have provided on the cam $d^6$ which is connected to the motor shaft a projecting pin $g^{26}$ which, each time the switch is closed, comes adjacent to the lower end of the lever $g^{20}$ and prevents the swinging of said lever in one direction, and a stop $g^{27}$ extending from the support $e^2$ beneath the arm $g^{21}$ prevents the swinging of the lever in the opposite direction.

In order to provide a buffer for the mechanism upon the operation of closing the switch, and also to assist the mechanism upon the opening of the switch, I have located on the base 7 a spring-pressed plunger $h^2$, which telescopes into a casing $h$ and is normally spring-pressed upwardly by a coil-spring $h^3$. (See Figs. 1 and 2.) This plunger is adapted to be contacted by the movable member of the switch and absorbs to a large extent the shock when the movable member is forced downwardly to close the switch. At the same time it assists the mechanism upon the opening operation and insures a quick break of the contacts in the event that the motor for any reason has run down to such an extent as might cause a sluggish action.

Having thus described my invention, I claim:

1. In a time-controlled operating device, a movable member, a motor mechanism, timing devices controlling the movement of said mechanism, a vertically movable rack connected to said movable member, and a connection between said motor mechanism and said rack to cause said rack to move said movable member in either direction, substantially as specified.

2. In a time-controlled operating device, a movable member, a vertically movable rack connected to said member, a motor mechanism, timing devices for controlling the movement of said mechanism, and connections between said rack and motor mechanism to cause said mechanism to impart to said rack a movement in either direction, substantially as specified.

3. In a time-controlled electric switch, a movable member of said switch, a vertically movable rack connected to said movable switch member, a motor mechanism, timing devices, for controlling the movement of said motor mechanism and said rack to impart to said rack a movement in either direction, substantially as specified.

4. In a time-controlled operating device, a movable member, a motor mechanism, timing devices for controlling the movement of said mechanism, a gear connected with said motor mechanism, one-half of said gear being devoid of teeth, two pinions adapted to be alternately engaged by the teeth of said gear and connections from said pinions to said movable switch member, substantially as specified.

5. In a time-controlled operating mechanism, a movable member, a rack connected to said member, a motor mechanism, timing devices for controlling the movement of said motor mechanism, one-half of said gear being devoid of teeth, two pinions on opposite sides of said gear adapted to be alternately engaged with the teeth thereof, a shaft to which said pinions are connected and a third pinion on said shaft meshing with said rack, substantially as specified.

6. In a time controlled operating device, a movable member, a motor mechanism, timing devices controlling the movement of said mechanism, a rack connected to said movable member and a connection between said motor mechanism and said rack whereby said rack and movable member will be moved in either direction by the operation of said motor mechanism, substantially as specified.

7. In a time-controlled operating device, a motor mechanism, time-operated devices for controlling the movement of said mechanism, hand-operated devices for also controlling the movement of said mechanism, and means operated by said hand-operated devices for temporarily throwing said time-operated devices out of operation, substantially as specified.

8. In a time-controlled operating device, a motor mechanism, time-operated devices for controlling the movement of said mechanism, hand-operated devices for also controlling the movement of said mechanism, means operated by said hand-operated devices for throwing said time-operated devices out of operation, and means operated by a succeeding operation of the mechanism for restoring said time-operated devices to operative position, substantially as specified.

9. In a time-controlled operating device, a motor mechanism, time-operated devices for controlling the movements of said motor mechanism, said time-operated devices comprising a pivoted pawl, hand-operated devices for also controlling the movements of said motor, and means operated by said hand-operated devices for temporarily throwing said pawl out of commission.

10. In a time-controlled operating device, a motor mechanism, time-operated devices for controlling the movement of said mechanism, said time-operated devices comprising a pivoted pawl, hand-operated devices for also controlling the movement of said mechanism, means operated by said hand-operated devices for throwing said pawl out of operative position, and means operated by a succeeding movement of said mechanism for restoring said pawl to operating position, substantially as specified.

11. In a time-controlled electric switch, the combination, with a movable member of said switch, of a motor mechanism, two sets of time operated devices for controlling the movement of said mechanism, a hand-operated device for also controlling the movement of said mechanism, means operated by said hand-operated device for throwing out of commission one set of said time operated devices, and means for restoring said time-operating devices to normal operative position.

12. In a time-controlled electric switch, a motor mechanism connected with said switch, a time-operated device for causing said mechanism to close said switch and a second time-operated device for causing said mechanism to open said switch, hand-operated devices also controlling said mechanism to cause the same to close or open said switch, and means operated by said hand-operated devices for temporarily throwing out of operation the time-operated switch-closing device, substantially as specified.

13. In a time-controlled electric switch, a motor mechanism connected with said switch, a time-operated device for causing said mechanism to close said switch, a time-operated device to cause said mechanism to open said switch, a hand-operated device for controlling said mechanism, means operated by said hand-operated device for throwing out of operation the time-operated switch-closing device, and means operated by a succeeding movement of said mechanism caused by the operation of said time-operated switch opening device for restoring said time operated switch-closing device to operative position.

14. In a time-controlled operating device, a motor mechanism, two sets of time-operated devices for controlling said mechanism, a hand-operated device for controlling said mechanism, and means whereby upon the operation of said hand-operated device either one of said time-operated devices may be temporarily thrown out of operative position, substantially as specified.

15. In a time-controlled operating device, a motor mechanism, time-operated devices for controlling said mechanism, a hand-operated device, means whereby upon the operation of said hand-operated device either one of said time-operated devices are thrown out of operative position, and means whereby upon a succeeding operation of said mechanism said time-operated devices are restored to operative position, substantially as specified.

16. In a time-operated electric switch, a motor mechanism, two sets of time-operated devices controlling said mechanism to respectively open and close said switch, a hand-operated device also controlling said mechanism to open or close said switch, and means whereby upon the operation of said hand-operated device either one of said time-operated devices is thrown out of operative position, and means for restoring said time-operated device to operative position upon a succeeding operation of said mechanism.

17. In a time-controlled operating device, a motor mechanism, a detent for said mechanism, time-operated devices controlling said detent to release said mechanism, hand-operated devices also controlling said detent to release said mechanism, and means for causing said detent to engage said mechanism after a predetermined movement thereof, and means whereby upon the operation of said hand-operated device certain of said time-operated devices are temporarily thrown out of operative position, substantially as specified.

18. In a time-controlled operating device, a motor mechanism, a detent for said mechanism, two sets of time-operated devices controlling said detent to release said mechanism, a hand-operated device also controlling said detent to release said mechanism, means for causing said detent to engage said mechanism after a predetermined movement thereof, means whereby upon the operation of said hand-operated device either one of said time-operated devices is thrown out of operative position, and means whereby said time-operated device is restored to operative position upon a succeeding operation of said mechanism, substantially as specified.

19. In a time-controlled operating device, a motor mechanism, a detent for said mechanism, a lock for said detent, time-operated devices for controlling said lock, hand-operated devices also controlling said lock, and means whereby upon the operation of said hand-operated devices certain of said time-operated devices are temporarily thrown out of operative position, substantially as specified.

20. In a time-controlled operating device, a motor mechanism, a detent for said mechanism, a series of pivoted pawls, time-operated devices for controlling said detent through the medium of said pawls, a hand-operated device also controlling said detent through one of said pawls, and means whereby upon the operation of said hand-operated device one of said time-operated pawls is temporarily thrown out of operated position, substantially as specified.

21. In a time-controlled operating device, a motor mechanism, a plurality of sets of time-operated devices for controlling said mechanism, and means whereby upon the operation of said mechanism one of said sets of time-controlled devices is temporarily thrown out of operative condition.

22. In a time-operated electric switch, a motor mechanism, two sets of time-operated devices for controlling said mechanism to open or close said switch, and means whereby upon the operation of the time-operated switch-opening controlling device the said switch-opening controlling device is thrown out of operative position until the next succeeding operation of said mechanism, substantially as specified.

23. In a time-controlled electric switch, a motor mechanism, two sets of time-operated devices for causing said motor to respectively open or close said switch, a hand-operated device also controlling said motor to open or close said switch, means whereby upon the operation of said hand-operated device said time-operated switch-closing controlling device is thrown out of operation, and means whereby upon the operation of said time-operated switch-opening controlling device the said switch-opening controlling device is thrown out of operative position until the next succeeding movement of said mechanism, substantially as specified.

24. In a time-controlled operating device, a motor mechanism, a detent for said mechanism, a rotatable lock for said detent, a series of pawls operatively connected with said lock and time-controlled trip arms for operating said pawls, substantially as specified.

25. In a time-controlled operating device, a motor mechanism, a detent for said mechanism, a spring-pressed rotatable lock normally engaging said detent, a series of pivoted pawls operatively connected to said lock, time operated trip arms for causing said pawls to operate said lock to release said detent, and means for restoring said detent to locked position, substantially as specified.

26. In a time-controlled operating device, a motor mechanism, two spring-pressed trip arms, time operated cams for causing said trip arms to operate at predetermined times, a detent for said motor mechanism, and pivoted pawls operatively connected with said detent, said pawls lying in the path of movement of said trip arms so as to be operated thereby to release said detent, substantially as specified.

27. In a time-controlled operating device, a motor mechanism, two spring-pressed trip arms, time controlled cams for operating said trip arms, a detent for said motor mechanism, a lock for said detent, and pivoted pawls operatively connected with said lock, said pawls lying in the path of movement of said trip arms to be operated thereby to cause said lock to release said detent.

28. In a time-controlled operating device, a motor mechanism of limited capacity, time-operated devices for controlling the movement of said motor mechanism, and means for preventing the further operation of said mechanism after a predetermined number of operations of the same until after the energy of said mechanism has been restored, substantially as specified.

29. In a time controlled operating device, a motor mechanism of limited capacity, time-operated devices for controlling the movement of said mechanism, means for preventing the operation of said motor mechanism after a certain number of operations of the same, devices for restoring the energy of said motor mechanism, and means operated by said restoring devices for placing said motor mechanism again in operative condition.

30. In a time-controlled device, a movable member, a spring motor connected with said member, means for winding said motor, timing devices controlling the movement of said motor and means for throwing said timing devices out of operation after a certain number of operations of said motor mechanism, and means for restoring said timing devices to operative position by the winding of said motor mechanism, substantially as specified.

31. In a time-controlled operating device, a movable member, a spring motor connected with said member, and winding devices for said motor mechanism, timing devices controlling the movement of said motor mechanism, and means for preventing the further operation of said motor mechanism at the end of a certain number of operations thereof until said motor mechanism has been re-wound by said winding devices, substantially as specified.

32. In a time-controlled operating device, a movable member, a motor mechanism connected with said member, a winding device for said member, timing devices for controlling the movement of said mechanism, and means when said movable member has been moved to one of its positions by said motor mechanism for preventing the further operation of said motor mechanism until the same has been re-wound by said winding device, substantially as specified.

33. In a time-controlled electric switch, a motor mechanism, a winding device for said mechanism, timing devices for controlling the movement of said mechanism to cause the same to open and close said switch, and means, when said switch is in open position, for preventing the further operation of said motor mechanism, until the same has been re-wound by said winding devices, substantially as specified.

34. In a time-controlled electric switch, a motor mechanism, a winding device for said mechanism, timing devices controlling the movement of said motor mechanism to cause the same to open and close said switch, and means at the end of one of the switch-opening operations of said motor mechanism for throwing said timing device out of operation after a certain number of operations of said motor mechanism, and means at the end of the operation of said winding device for restoring said timing devices to operative position, substantially as specified.

35. In a time-controlled operating device, a movable member, a motor mechanism connected with same, controlling devices for said mechanism, and means operated by the movement of said motor mechanism for preventing the further operation of same at the end of a given number of operations of said mechanism, substantially as specified.

36. In a time-controlled operating device, a movable member, a motor mechanism connected with same, controlling devices for said mechanism to permit same to move said member from one position to another, and means operated by the movement of said motor mechanism for preventing the further operation of same at the end of a given number of operations of said mechanism and after said mechanism has moved said member to a certain one of its positions, substantially as specified.

37. In a time-controlled operating device, a movable member, a motor mechanism connected with same, controlling devices to permit said motor mechanism to move said member from one position to another, and means operated by the movement of said motor mechanism for throwing said controlling devices out of operative position at the end of a given number of operations of said motor mechanism, substantially as specified.

38. In a time-controlled operating device, a movable member, a spring motor connected with said member, a winding device for said motor mechanism, controlling devices for said motor mechanism, and means operated by the movement of said motor mechanism for preventing the further operation of same after a given number of operations of said mechanism, until said motor mechanism has been re-wound by said winding device, substantially as specified.

39. In a time-controlled operating device, a movable member, a spring motor connected with said member, a winding device for said motor mechanism, timing devices for controlling the movement of said motor mechanisms, and means operated by the movement of said motor mechanism for throwing said timing devices out of operation after a given number of operations of said motor mechanism, and means operated by said winding device for restoring said timing devices to operative position, substantially as specified.

40. In a time-controlled electric switch, the combination, with the movable member of said switch, of a motor mechanism, connections between said motor mechanism and said movable switch member, time-operated controlling devices for said motor mechanism, winding devices for said motor mechanism, and means for locking said winding devices at a certain point in the winding operation thereof, for the purpose specified.

41. In a time controlled electric switch, the combination, with the movable member of said switch, of a motor mechanism, connections between said motor mechanism and said movable switch member, time-controlling devices for said mechanism, normally unlocked winding devices for said mechanism, and means for locking said winding devices at a certain point in the winding operation thereof, substantially as specified.

42. In a time-controlled operating device, a motor mechanism, a normally unlocked winding device for said mechanism, means for locking said winding device at a certain point in the winding operation thereof, and means for unlocking said device by the operation of said motor mechanism, substantially as specified.

43. In a time-controlled operating device, a motor mechanism, a winding device for said mechanism, means for preventing the operation of said motor mechanism after a certain number of operations thereof, and means for locking said winding device at a certain point in its winding operation and for restoring said motor mechanism to operative position, substantially as specified.

44. In a time-controlled operating device, a motor mechanism, a winding device for same, timing devices for controlling the movement of said mechanism, means for throwing said timing devices out of operation after a certain number of operations of said motor mechanism, and means for locking said winding devices at a certain point in its winding operation and for restoring said timing devices to operative position, substantially as specified.

45. In a time-controlled operating device, a motor spring, a shaft connected with said spring, means for controlling the movement of said shaft, a winding shaft for said spring, a rotatable device adapted to be moved in one direction by said motor shaft and in the opposite direction by said winding shaft, and means on said rotatable device for locking said shaft from movement at a certain point in the winding operation thereof, substantially as specified.

46. In a time-controlled operating device, a spring motor, a shaft connected therewith, devices for controlling the movement of said shaft, a winding shaft for said motor, a rotatable device adapted to be moved in one direction by said motor shaft and in the opposite direction by said winding shaft, connections from said rotatable device to said controlling devices to throw said devices out of operation after a given number of movements of said motor shaft, and connections from said rotatable device to said winding shaft to lock said winding shaft at a certain point in the winding operation thereof, substantially as specified.

47. In a time-controlled operating device, a motor mechanism, a winding device for said mechanism including a key, a movable member adapted to be operated from one position to another by said motor mechanism, and means for preventing the application of said key to said winding device in one position of said movable member, substantially as specified.

48. In a time-controlled operating device, a motor mechanism, a winding device for same, a movable member adapted to be operated from one position to another by said motor mechanism, a key for said winding device, a door leading to said winding device, and means for automatically locking said door in one position of said movable member and for automatically unlocking said door in the other position of said movable member, substantially as specified.

49. In a time-controlled electric switch, a motor mechanism having a connection with said switch, a winding device for said mechanism including a key, and means for preventing the application of said key to said winding device in the closed position of said switch, substantially as specified.

50. In a time-controlled electric switch, a motor mechanism, a winding device for said mechanism including a key, and means for automatically preventing the application of said key to said winding device in the closed position of said switch, but permitting the insertion of said key to said winding device in the open position of said switch, substantially as specified.

51. In a time-controlled operating device, a motor mechanism, a winding device for said mechanism including a key, a movable member adapted to be operated from one position to another by said motor mechanism, means for preventing the insertion of said key in one position of said movable member, and means for permitting the application of said key thereto in the other position of said movable member, and means for locking said winding device at a certain point in the winding operation thereof, substantially as specified.

52. In a time-controlled device, a spring motor mechanism operatively connected with said device, clock-controlled tripping devices for said motor mechanism together with means for throwing the same out of operative condition after a predetermined number of operations of said motor mechanism, a winding device for said mechanism including a key, means for locking said key to said winding device during the winding operation, and means controlled by the extent of operation of said motor mechanism as determined by said tripping devices for unlocking said key.

53. In a time-controlled device, a spring motor mechanism operatively connected with said device, clock-controlled tripping devices for said motor mechanism together with means for throwing the same out of operative condition after a predetermined number of operations of said motor mechanism, a winding device for said mechanism including a key, means for locking said key to said winding device during the winding operation, and means controlled by the extent of operation of said motor mechanism as determined by said tripping devices for unlocking said key, and for also locking said winding device.

54. In a time-controlled operating device, a motor mechanism, a winding device for said mechanism including a key, a movable member adapted to be operated from one position to another by said motor mechanism, means for preventing the application of said key to said winding device in one position of said movable member, means for locking said key to said winding device during the winding operation, and means for unlocking said key and for locking said winding device at the end of said winding operation, substantially as specified.

55. In a time-controlled operating device, a motor mechanism, a winding device for same including a key, a movable member, controlling devices for said mechanism to cause the same to move said member from one position to another at predetermined times, means for throwing said controlling devices out of operation at the end of a certain number of operations of said motor mechanism, means for locking said key to said winding device during the winding operation, means caused by the winding operation for permitting said controlling devices to return to operating position, and means for locking said winding device at a certain point in its winding operation, substantially as specified.

In testimony whereof, I have hereunto set my hand this 25th day of October, 1909.

GEORGE R. CLARK.

Witnesses:
CHAS. I. WELCH,
OLIVER T. CLARKE.